United States Patent
Burrus, IV et al.

(10) Patent No.: US 6,900,616 B2
(45) Date of Patent: May 31, 2005

(54) CURRENT INTERRUPT DEVICE FOR RECHARGEABLE CELLS

(75) Inventors: Philip H. Burrus, IV, Lilburn, GA (US); Guoping Deng, Lawrenceville, GA (US); Edmond Louie, Snellville, GA (US)

(73) Assignee: Motorola, Inc., Schaumburg, IL (US)

(*) Notice: Subject to any disclaimer, the term of this patent is extended or adjusted under 35 U.S.C. 154(b) by 25 days.

(21) Appl. No.: 10/442,732

(22) Filed: May 21, 2003

(65) Prior Publication Data

US 2004/0232888 A1 Nov. 25, 2004

(51) Int. Cl.$^7$ .............................................. H01M 10/46
(52) U.S. Cl. .................................................. 320/147
(58) Field of Search ................................ 320/107, 112, 320/147; 429/34, 35, 53, 54, 57, 64

(56) References Cited

U.S. PATENT DOCUMENTS

| | | | |
|---|---|---|---|
| 3,706,617 A | * | 12/1972 | Stark et al. .................... 429/54 |
| 3,969,146 A | * | 7/1976 | Tietze .......................... 429/176 |
| 5,418,082 A | | 5/1995 | Taki et al. |
| 5,580,679 A | * | 12/1996 | Tanaka ......................... 429/185 |
| 5,738,952 A | * | 4/1998 | Abe ............................. 429/56 |

* cited by examiner

*Primary Examiner*—Edward H. Tso
(74) *Attorney, Agent, or Firm*—Philip H. Burrus, IV

(57) ABSTRACT

A current interrupt device for rechargeable, electrochemical cells having a safety valve, insulating spacer and a thin metal plate for coupling to an electrode assembly is provided. The thin metal plate electrically couples to the safety valve by way of a conductive polymer, preferably having a positive temperature coefficient characteristic. The positive temperature coefficient characteristic is such that the impedance of the polymer increases with increasing temperature. In normal operation, the polymer conducts current. In high current situations, where internal components heat due to parasitic resistances, the polymer becomes an insulator and disconnects the cell from the exterior can. When gasses build within the cell, the safety valve deforms, thereby causing the safety valve to separate from the thin metal plate. Once the safety valve and thin metal plate have separated, the electrode assembly is electrically isolated from the exterior can.

18 Claims, 3 Drawing Sheets

CURRENT INTERRUPT DEVICE FOR RECHARGEABLE CELLS

BACKGROUND

1. Technical Field

This invention relates generally to protection devices for rechargeable cells, including electrochemical cells and super capacitors, and more particularly to devices that interrupt current when pressure builds within a rechargeable cell.

2. Background Art

Rechargeable batteries have become integral components of everyday life. Portable electronic devices like cellular telephones, two way radios and laptop computers rely upon rechargeable batteries for their portability. The rechargeable battery offers a way to slip the surly bonds of wall mounted power supplies and touch the face of the wireless world.

Battery packs generally include a plastic housing, electronic circuitry and at least one rechargeable cell. The cell within the battery pack is the device that stores and releases electrochemical energy. Many of these cells are sealed within cylindrical, aluminum (or steel) cans. Within these cans exist the cell's electrode assembly: electrode materials, a separator to keep the electrodes apart, and electrolyte. One of the most popular cans in use today is known as the "18-650" can. It is so named because it is 18 mm in diameter and 65 mm long.

Some cell chemistry types, like lithium-ion for example, produce gas when they are improperly charged, shorted or exposed to high temperatures. This gas can be combustible and may compromise the reliability of the cell. As such, protection circuitry is placed within the battery pack and about the cell to ensure that the cell is not over charged. The protection circuitry generally consists of integrated circuits and other components. Like any physical system, there is a small possibility that one of the components in the protection circuit may fail in the field. For this reason, the cells themselves often include back-up, or redundant, safety components to ensure that the cell is not overcharged.

A popular way of providing secondary protection for a cell is by way of a current interrupt device. One of the more popular current interrupt devices in use today is recited in U.S. Pat. No. 5,418,082, entitled Sealed Battery with Current Cut Off Means, issued May 23, 1995, to Taki et al., incorporated herein by reference. Such a device is illustrated in FIG. 1.

FIG. 1 is a cross-sectional view of the current interrupt device. A sealed cell has a safety valve 5 made of a metal plate that may be deformed by an increase of pressure within the cell. The current interrupt device 6 is actuated by the deformation of the safety valve 5. An insulating disk 23 is fixed between the safety valve 5 and the cell electrode 1. This disk 23 has a central aperture 21 through which the projection 9 of the safety valve 5 is inserted. The disk further includes gas apertures 22 through which a gas, if and when it is generated by the cell, is passed.

A thin metal plate 24, which is electrically connected to one ribbon lead 7 of the cell electrode 1 is attached to the electrode side of the disk 23 in such a manner as to close the central aperture 21. The safety valve projection 9 is welded through the central aperture 21 to the thin metal plate 24.

Referring now to FIG. 2, illustrated therein is the current interrupt device of FIG. 1 after being actuated by gas within the cell. The safety valve 5 has been pushed up by gas generated within the cell that passed through aperture 22 and placed pressure upon the safety valve 5. The safety valve 5 then deformed by swelling toward the cap 3 of the cell. In so doing, the weld between the safety valve 5 and the thin metal plate 24 is broken, thereby interrupting current flow.

The problem with this invention is the weld (between the projection 9 and the metal plate 24). To begin, an expensive, precision welder is required to make the tiny weld through the aperture 21 of the disk 23. Next, if this weld is slightly too strong, the current interrupt device will not open quickly enough. If the weld is slightly too weak, there will be nuisance opening of the current interrupt device. If an operator manufacturing the current interrupt device errs ever so slightly during the welding process, reliability of the device will be compromised. In short, if the welding process is not an extremely precise, six-sigma or better manufacturing process, the current interrupt device will not function as designed.

There is thus a need for an improved secondary protection device for rechargeable electrochemical cells.

DETAILED DESCRIPTION OF THE INVENTION

Figure 1:
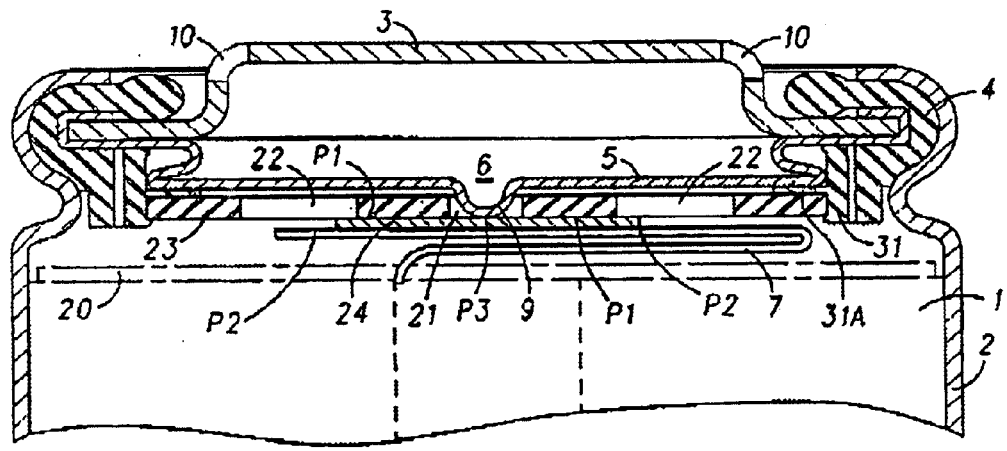
FIG. 1 illustrated a prior art current interrupt device.
Figure 2:
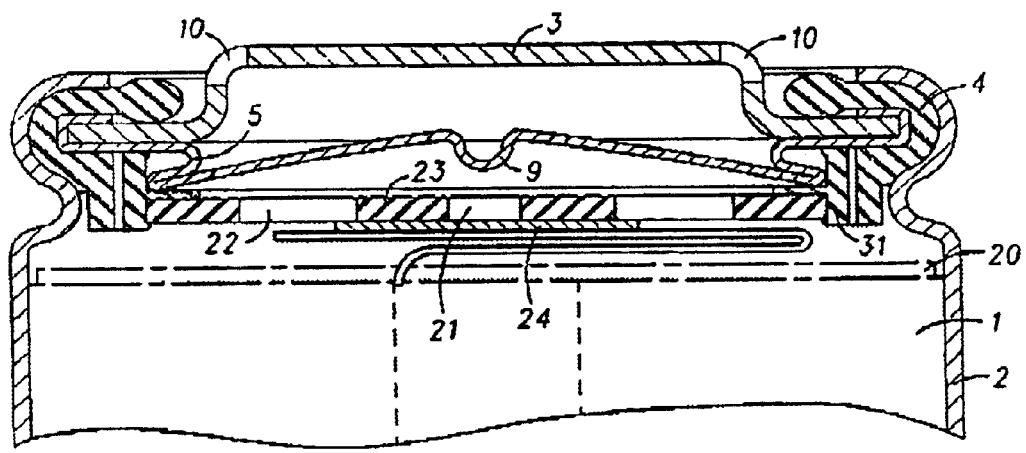
FIG. 2 illustrates a prior art current interrupt device after actuation.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 3:
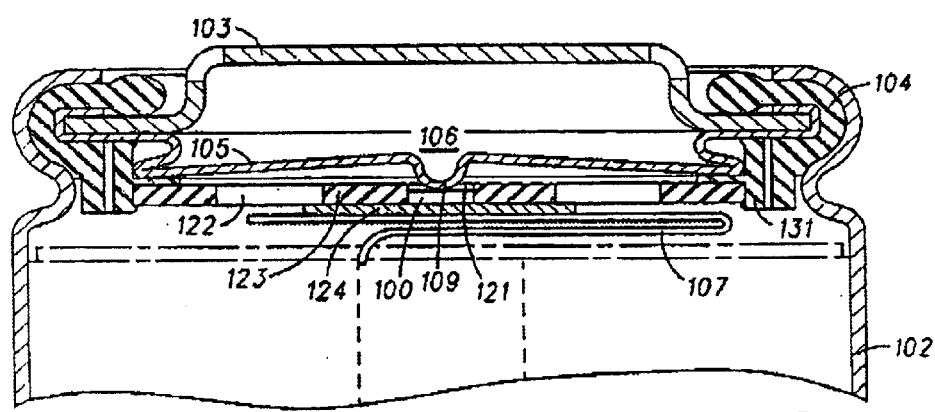
FIG. 3 illustrates a current interrupt device in accordance with the invention.

Referring now to FIG. 3, illustrated therein is a current interrupt device (CID) 106 in accordance with the invention. This CID 106 offers advantages over the prior art in that it not only provides cell protection against internal pressure, but also provides overcurrent and thermal protection as well. Additionally, this CID 106 eliminates the need for costly welding equipment and precision welds.

The CID 106 is implemented in a battery can 102, which is preferably steel, aluminum or an equivalent thereof. The can 102 houses the electrode assembly 101 of the cell, which may include cathode material, anode material, separator, electrolyte and other electrochemical storage components. (Note that with respect to batteries, the cathode is the positive electrode and the anode is the negative electrode.)

The can 102 is closed with a lid 103 that is preferably hermetically sealed by crimping, gluing or welding to the can 103. An optional gasket 104 may be included to provide a gas or liquid tight seal. The can 102 traditionally serves as the external anode of the cell, while the lid 103 traditionally serves as the external cathode of the cell.

The CID 106 itself comprises a safety valve 105 with a protrusion 109. The safety valve 105 is preferably manufactured from a soft, deformable metal. The protrusion 109 is preferably disposed towards the center of the safety valve 105. An insulating spacer 123 is disposed between the safety valve 105 and the electrode assembly 101. The insulating spacer 123 includes a plurality of apertures, including a protrusion aperture 121 and at least one gas aperture 122. The protrusion aperture 121 is preferably disposed towards the center of the insulating spacer 123. The insulating spacer 123 is preferably held in place by a spacer holder 131. The alignment of the insulating spacer 123 relative to the safety valve 105 is such that the protrusion 109 fits within the protrusion aperture 121.

A thin metal plate 124 is disposed against the insulating spacer 123 opposite the safety valve 105 (i.e. on the same side of the insulating spacer 123 as the electrode assembly 101). The thin metal plate 124 is aligned relative to the insulating spacer 123 so as to cover the protrusion aperture 121. An electrically conductive ribbon lead 107 couples the electrode assembly 101 to the thin metal plate 124.

Figure 5:
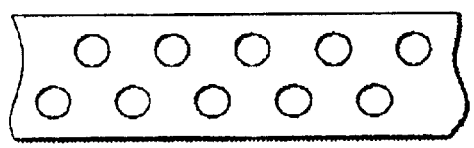
FIG. 5 illustrates a positive temperature coefficient polymer at an elevated temperature.
Figure 4:
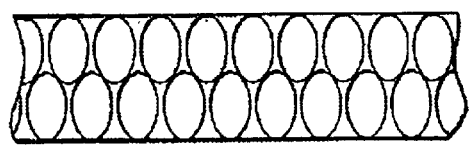
FIG. 4 illustrates a positive temperature coefficient polymer at an ambient temperature.

The protrusion 109 electrically couples to the thin metal plate by way of an electrically conductive polymer 100. The polymer is preferably a positive temperature coefficient polymer (PTCP). As illustrated in FIGS. 4 and 5, a PTCP comprises composite of semi-crystalline polymer and conductive particles. The PTCP may either be a pure or composite polymer. At normal temperature, as shown in FIG. 4, the conductive particles are disposed closely together to form low-impedance networks capable of conducting current through the polymer. Once the polymer temperature rises beyond a predetermined threshold (determined by the chemical composition of the polymer), however, the crystallites in the polymer melt and become amorphous. The resulting increase in volume due to crystalline phase melting causes separation of the conductive particles, as shown in FIG. 5. This results in a large, non-linear increase in the impedance of the PTCP. The increase in impedance is exponential in nature and rapidly stops any flow of current through the polymer. Temperature rise occurs when abnormally high currents flow through the polymer and cause resistive heating of the surrounding components.

Figure 6:
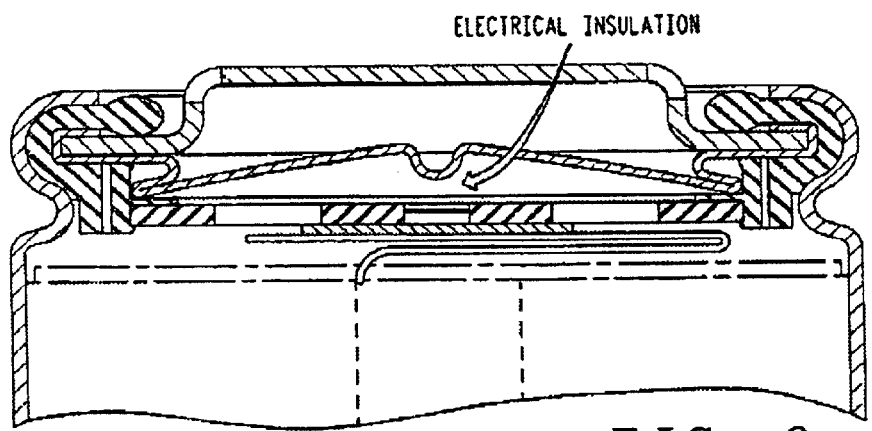
FIG. 6 illustrates a current interrupt device that has been actuated in accordance with the invention.

Referring again to FIG. 3, the CID 106 interrupts current in multiple ways. The first way is dependent upon pressure. When gasses build within the cell, the gasses pass through the gas aperture(s) 122 and place pressure on the safety valve 105. As the safety valve 105 is preferably manufactured from a soft, deformable metal, this net pressure causes the safety valve 105 to deform away from the electrode assembly 101. This deformation causes the protrusion 109 to pull free from the PTCP 100, not unlike separating one cookie of an Oreo™ from the other cookie and the ever so tasty cream filling. This separation stops any current flow between the electrode assembly 101 and the world outside the can 102. A deformed safety valve 105, analogous to the split Oreo™, is illustrated in FIG. 6.

The second way of interrupting current with the CID 106 depends upon current. When excessively high currents pass through the PTCP 100, to parasitic, resistive losses cause both the polymer and the surrounding components (the thin metal plate 124, the safety valve 105 and the ribbon lead 107) to heat. This heating causes the PTCP 100 to go from a low-impedance state to a high impedance state. The transition essentially stops the flow of current.

The third way of interrupting current depends upon temperature. It is well known in the art that cell performance is degraded with electrochemical cells are charged or discharged at high temperatures. When the cell can, and thus the cell contents, heat due to exothermic conditions, the internal components heat, thereby causing the PTCP 100 to go from a low-impedance state to a high impedance state. The transition stops the flow of current.

Figure 7:
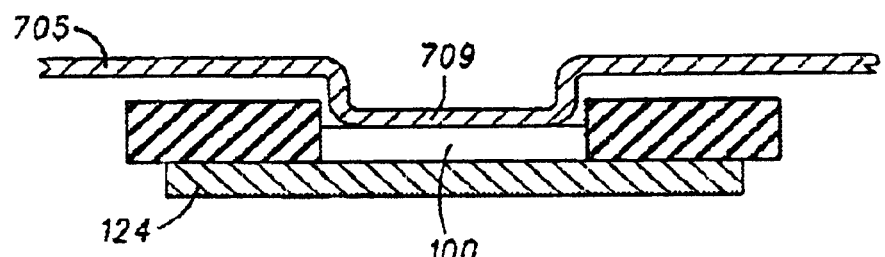
FIG. 7 illustrates one cross section of a protrusion in accordance with the invention.

In FIG. 3, the protrusion 109 is illustrated as a semicircle, which is convenient for manufacture of the safety valve 105. Referring now to FIG. 7, illustrated therein is a preferred geometry for the protrusion 705. The protrusion 705 is preferably a semi-rectangle. A semi-rectangle offers greater surface area for interconnection to the PTCP 100. This increased surface area reduces contact impedance between the thin metal plate 124 and the safety valve 705, thereby reducing the overall internal impedance of the cell.

To this point, the CID has been analogous to an Oreo cookie, with PTCP sandwiched between two metal plates. It is the mechanical rigidity of safety valve material that keeps the PTCP sandwiched between the safety valve and the thin metal plate. Such a mechanical "pressure contact" works well in benign to normal environments. One issue that a designer must keep in mind when designing electronic devices, however, is the notorious "drop test". Drop testing is a grueling design evaluation test where a finished product is dropped anywhere from three to five feet to a surface of wood, tile or even concrete. Most product design specifications require that the product withstand such a drop with no degradation in performance. One issue with pressure contacts subjected to these tests is that they may momentarily open and then "bounce back". In the case of battery products, such a bounce may disrupt power to the host device.

Figure 8:
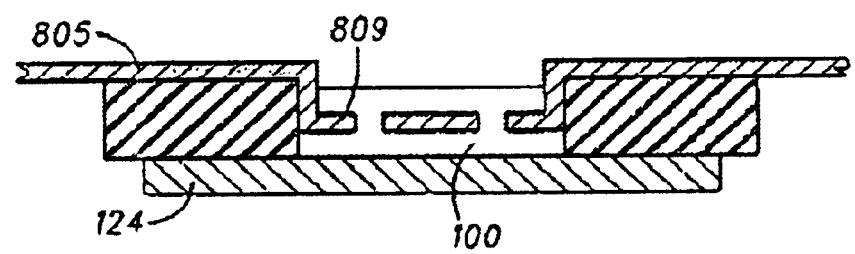
FIG. 8 illustrates a preferred cross section of a protrusion in accordance with the invention.

Referring now to FIG. 8, illustrated therein is a preferred embodiment of a "bounce resistant" CID in accordance with the invention. In this particular embodiment, the protrusion 809 includes at least one aperture. PTCP 100 is then disposed both above and below the protrusion 809 so as to form columns of PTCP that pass through the protrusion 809 of the safety valve 805. This structure requires a significant deformation of the safety valve 805 to completely decouple the safety valve from the thin metal plate 124. This significant deformation requirement prevents nuisance disconnects resulting from bounce issues.

Figure 9:
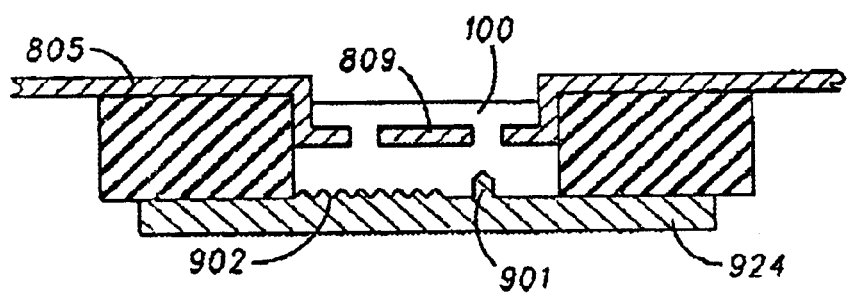
FIG. 9 illustrates a way to reduce the contact impedance between the thin metal plate and the positive temperature coefficient impedance in accordance with the invention.

One other design issue that may arise involves spreading a PTCP across a smooth metal surface. If the PTCP does not adhere completely, tiny pockets of air may form between the PTCP and the metal. These pockets of air increase the contact impedance of the CID. Referring now to FIG. 9, illustrated therein is a CID with reduced contact impedance. The CID of FIG. 9 includes two methods of reducing the contact impedance. These methods may be used together or in combination.

The first method involves roughening the surface of the thin metal plate 924. The roughened portion is illustrated as portion 902. By roughening the surface, small depressions and raised portions are formed. When the PTCP 100 is deposited upon the roughened portion 902, the roughened surface causes the PTCP 100 to fill in the depressions, thereby reducing contact impedance.

The second method involves anchors 901 that are added to the small metal plate 924. These anchors 901 serve as small barbs that penetrate the PTCP 100, thereby increasing the surface area of the thin metal plate 924 that is in contact with the PTCP 100. This increased surface area also reduces the contact impedance.

The present invention offers several advantages over the prior art. First, the PTCP requires no welding. As such, neither expensive welding equipment nor precision welding processes are required. Second, the invention offers added value in that a single CID provides not only protection from excess pressure, but protection from thermal and overcurrent conditions as well.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A current interrupt device for a rechargeable, electrochemical cell, the device comprising:
   a. a safety valve that may be deformed by an increase of internal pressure within the electrochemical cell, the safety valve comprising a protrusion;
   b. a thin metal plate for coupling to an electrode assembly of the electrochemical cell; and
   c. an insulating disk comprising a plurality of apertures, wherein the protrusion is inserted into one of the plurality of apertures, further wherein the insulating disk is disposed between the safety valve and the thin metal plate;
   wherein the thin metal plate is electrically coupled to the safety valve by an electrically conductive polymer.

2. The device of claim 1, wherein the polymer exhibits a positive temperature coefficient such that the polymer transitions from a low impedance to a high impedance with increasing temperature.

3. The device of claim 2, wherein the insulating disk comprises at least one aperture capable of passing gas from the electrode assembly so as to exert pressure on the safety valve.

4. The device of claim 3, wherein the protrusion has a semi-rectangular cross section.

5. The device of claim 4, wherein the insulating disk is mechanically held in place by a space holder.

6. The device of claim 5, wherein the protrusion comprises at least one aperture.

7. The device of claim 6, wherein the polymer is deposited both above and below the protrusion.

8. The device of claim 6, wherein the thin metal plate is roughened.

9. The device of claim 6, wherein the thin metal plate includes at least one anchor.

10. An electrochemical cell comprising the device of claim 1.

11. The cell of claim 10, wherein the device is mechanically coupled between a lid of the battery and a can of the battery.

12. The cell of claim 11, wherein a gasket is disposed between the lid and the can.

13. A current interrupt device for an electrochemical cell, wherein the current interrupt device comprises:
   a. a safety valve that may be deformed by an increase of internal pressure within the electrochemical cell, the safety valve comprising a protrusion;
   b. a thin metal plate for coupling to an electrode assembly of the electrochemical cell; and
   c. an insulating disk comprising a plurality of apertures, wherein the protrusion is inserted into one of the plurality of apertures, further wherein the insulating disk is disposed between the safety valve and the thin metal plate;
   d. wherein the thin metal plate is electrically coupled to safety valve by an electrically conductive polymer.

14. The cell of claim 13, wherein when pressure exceeds a predetermined threshold within the cell, the current interrupt device prevents current from flowing from electrode assembly disposed within cell to an exterior cell housing: further wherein when a current flowing through the cell exceeds a predetermined threshold, the current interrupt device prevents current from flowing from up electrode assembly disposed within the cell to an exterior cell housing: further wherein when the temperature of the current interrupt device exceeds a predetermined threshold, the current interrupt device prevents current from flowing from an electrode assembly disposed within the cell to an exterior cell housing.

15. The device of claim 13, wherein the protrusion comprises at least one aperture.

16. The device of claim 15, wherein the polymer is deposited both above and below the protrusion.

17. The device of claim 16, wherein the thin metal plate is roughened.

18. The device of claim 17, wherein the thin metal plate includes at least one anchor.

* * * * *